(12) United States Patent
Gorges et al.

(10) Patent No.: US 10,202,702 B2
(45) Date of Patent: Feb. 12, 2019

(54) SLIDING ENGINE COMPONENT

(71) Applicants: Mahle International GmbH, Stuttgart (DE); Mahle Engine Systems UK Limited, Warwikshire (GB)

(72) Inventors: Roger Gorges, Birmingham (GB); John Carey, Northamptonshire (GB); Anil Rathod, Northamptonshire (GB)

(73) Assignees: Mahle International GmbH (DE); Mahle Engine Systems UK Ltd (GB)

( * ) Notice: Subject to any disclaimer, the term of this patent is extended or adjusted under 35 U.S.C. 154(b) by 44 days.

(21) Appl. No.: 15/110,731

(22) PCT Filed: Jan. 8, 2015

(86) PCT No.: PCT/EP2015/050250
§ 371 (c)(1),
(2) Date: Jul. 8, 2016

(87) PCT Pub. No.: WO2015/104329
PCT Pub. Date: Jul. 16, 2015

(65) Prior Publication Data
US 2016/0333489 A1    Nov. 17, 2016

(30) Foreign Application Priority Data
Jan. 10, 2014    (GB) .................... 1400395.8

(51) Int. Cl.
*B32B 15/02*    (2006.01)
*C25D 3/30*    (2006.01)
(Continued)

(52) U.S. Cl.
CPC .................. *C25D 3/30* (2013.01); *C25D 5/10* (2013.01); *C25D 5/18* (2013.01); *C25D 7/10* (2013.01);
(Continued)

(58) Field of Classification Search
None
See application file for complete search history.

(56) References Cited

U.S. PATENT DOCUMENTS 5,342,698 A * 8/1994 Fujisawa ................. F16C 33/12
384/912
6,312,579 B1 11/2001 Bank et al.
(Continued)

FOREIGN PATENT DOCUMENTS

DE    102011113448 A1    4/2012
DE    102012208681 A1    11/2013
(Continued)

OTHER PUBLICATIONS

English abstract for DE-102012208681.
GB Search Report for GB1400395.8, dated Jul. 10, 2014.
English abstract for JP-2005105354.

*Primary Examiner* — Seth Dumbris
(74) *Attorney, Agent, or Firm* — Fishman Stewart PLLC

(57) ABSTRACT

A sliding engine component may include a substrate having a surface coated with a first electroplated metallic layer and a second electroplated metallic layer. The first metallic layer may be disposed between the substrate and the second metallic layer. The first metallic layer and the second metallic layer may have a grained structure. The grained structure of each of the first metallic layer and the second metallic layer may have an aspect ratio between a mean grain size perpendicular to the substrate surface and a mean grain size parallel to the substrate surface. The aspect ratio of the second metallic layer may be less than the aspect ratio of the first metallic layer.

19 Claims, 4 Drawing Sheets

(51) Int. Cl.
*C25D 5/10* (2006.01)
*C25D 5/18* (2006.01)
*C25D 7/10* (2006.01)
*C25D 15/00* (2006.01)
*F16C 17/02* (2006.01)

(52) U.S. Cl.
CPC .............. *C25D 15/00* (2013.01); *F16C 17/02* (2013.01); *Y10T 428/1209* (2015.01); *Y10T 428/12049* (2015.01); *Y10T 428/12056* (2015.01); *Y10T 428/12063* (2015.01)

(56) References Cited

U.S. PATENT DOCUMENTS

| | | |
|---|---|---|
| 2006/0216539 A1 | 9/2006 | Takayanagi et al. |
| 2007/0158204 A1 | 7/2007 | Taylor et al. |
| 2012/0064358 A1 | 3/2012 | Takayanagi et al. |

FOREIGN PATENT DOCUMENTS

| | | | | |
|---|---|---|---|---|
| JP | 07150388 | * | 6/1995 | ............... C25D 5/08 |
| JP | 2005-105354 A | | 4/2005 | |
| JP | 2005105354 | * | 4/2005 | ............... C25D 7/00 |
| WO | WO-02/072923 A2 | | 9/2002 | |

* cited by examiner

SLIDING ENGINE COMPONENT

CROSS-REFERENCE TO RELATED APPLICATIONS

This application claims priority to British Patent Application No. 1400395.8, filed Jan. 10, 2014, and International Patent Application No. PCT/EP2015/050250, filed Jan. 8, 2015, both of which are hereby incorporated by reference in their entirety.

TECHNICAL FIELD

The present invention relates to sliding engine components having electroplated bearing layers, and in particular to sliding engine components for sliding bearing assemblies, for example including bearing lining shells, bushes, bearing surfaces of crankshafts, bearing surfaces of camshafts, bearing surfaces of connecting rods, thrust washers, flanges, bearing surfaces of a bearing block, bearing surfaces of a bearing cap, and piston assembly components, e.g. piston rings, piston skirts, cylinder walls and cylinder liners.

BACKGROUND

In internal combustion engines, the bearing assemblies typically each comprise a pair of halfbearings retaining a crankshaft that is rotatable about an axis. Each half bearing is a hollow generally semi-cylindrical bearing shell, and typically at least one is a flange half bearing, in which the bearing shell is provided with a generally semi-annular thrust washer extending outwardly (radially) at each axial end. In other bearing assemblies it is also known to use an annular or circular thrust washer.

The bearing surfaces of bearing shells and thrust washer generally have a layered construction, in which a strong backing material is coated with one or more layers having preferred tribological properties to provide a bearing surface that faces a cooperating moving part, a crankshaft journal, in use. Known bearing shells have a substrate comprising a backing coated with an overlay layer, and commonly an intervening lining layer.

The strong backing material may be steel, having a thickness of about 1 mm or more. A known lining layer may be a copper-based material (e.g. copper-tin bronze) or an aluminium-based material (e.g. aluminium or aluminium-tin alloy), which is adhered to the substrate (either directly to the backing or to an optional interlayer). The thickness of the lining layer is generally in the range from about 0.05 to 0.5 mm (e.g. 300 μm of copper-based alloy of 8% wt Sn, 1% wt Ni, and balance of Cu, apart from incidentally impurities).

The overlay layer may be 6 to 25 μm of a plastic polymer-based composite layer or a metal layer (e.g. a tin-based alloy overlay layer), which may be deposited by spraying, sputtering or electroplating.

A particular challenge to the performance of bearing lining layers and/or overlay layers is provided by the fuel-saving configuration of vehicle engines to "stop-start" operation, in which the engine is stopped and requires restarting each time the vehicle stops, in contrast to conventional engine operation, in which the engine is kept running throughout a vehicle's journey. Engines configured for stop-start operation may restart their engines about one hundred times more frequently than conventionally configured engines, which are run continuously throughout each vehicle journey. Although engine bearings are conventionally hydrodynamically lubricated during use, typically little or no lubrication is provided to the bearings when the engine starts. Accordingly, stop-start operating of an engine can place increased demands upon the performance of the bearings.

SUMMARY

According to a first aspect, there is provided a sliding engine component comprising a substrate having a surface coated with first and second electroplated metallic layers, the first metallic layer being provided between the substrate and the second metallic layer, wherein the first and second metallic layers have grained structures each having an aspect ratio between the mean grain size perpendicular to the substrate surface and the mean grain size parallel to the substrate surface, and wherein the aspect ratio of the second metallic layer is less than the aspect ratio of the first metallic layer.

According to a second aspect, there is provided an engine comprising a sliding engine component according to the first aspect.

According to a third aspect, there is provided a method of manufacturing a sliding engine component comprising a substrate having a surface coated with first and second electroplated metallic layers, the first metallic layer being provided between the substrate and the second metallic layer, wherein the first and second metallic layers are grained structures each having an aspect ratio between the mean grain size perpendicular to the substrate surface and the mean grain size parallel to the substrate surface, and wherein the aspect ratio of the second metallic layer is less than the aspect ratio of the first metallic layer, the method comprising: providing the substrate as a cathode in an electrolyte comprising metal ions, depositing the first metallic layer by a first electroplating stage of either applying a first repeating cycle of bias pulses to the substrate at a first repetition frequency with a first duty cycle or applying a direct current to the substrate, and depositing the second metallic layer by a second electroplating stage of applying a second repeating cycle of bias pulses to a substrate at a second repetition frequency with a second duty cycle of less than 100%, wherein if the first electroplating stage comprises applying a first repeating cycle of bias pulses, the second duty cycle is lower than the first duty cycle and/or the second repetition frequency is higher than the first repetition frequency.

The first metallic layer may have an aspect ratio of at least 2:1.

The first metallic layer may have an aspect ratio of at least 4:1.

The first metallic layer may have an aspect ratio of up to 30:1.

The first metallic layer may have a substantially columnar grain structure.

The second metallic layer may have an aspect ratio of less than 1.5:1.

The second metallic layer may have an aspect ratio of at least 0.5:1.

The second metallic layer may have a substantially equi-axed grain structure.

The sliding engine component may comprise a third electroplated metallic layer provided between the first metallic layer and the second metallic layer, wherein third metallic layer has a grained structure having an aspect ratio between the mean grain size perpendicular to the substrate surface and the mean grain size parallel to the substrate surface, and wherein the aspect ratio of the third metallic layer is less than the aspect ratio of the first metallic layer and more than the aspect ratio of the second metallic layer.

The aspect ratio of the third metallic layer may be less than the aspect ratio of the first metallic layer and more than the aspect ratio of the second metallic layer.

A metallic layer may comprise tin.

A metallic layer may comprise pure tin, apart from incidental impurities.

A metallic layer may be a composite layer comprising hard particulate distributed in a metallic matrix.

The second duty cycle may be lower than the first duty cycle.

The first duty cycle may be 70 to 100%. The second duty cycle may be 10 to 30%.

The second repetition frequency may be higher than the first repetition frequency.

The first repetition frequency may be 0 to 10 Hz.

The second repetition frequency may be 50 to 500 Hz.

BRIEF DESCRIPTION OF THE DRAWINGS

Embodiments of the invention are further described hereinafter with reference to the accompanying drawings, in which.

DETAILED DESCRIPTION

In the described embodiments, like features have been identified with like numerals, albeit in some cases having one or more of: increments of integer multiples of 100. For example, in different figures, 100, 200 and 300 have been used to indicate a bearing shell.

Figure 1A:
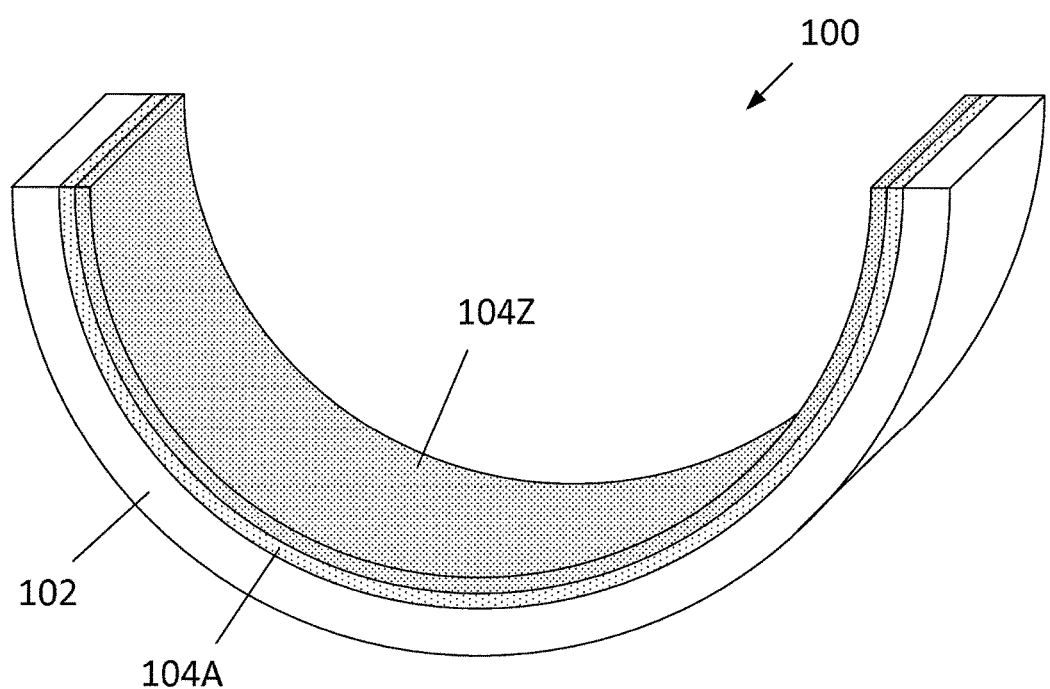
FIG. 1A schematically illustrates a bearings shell, which is an embodiment of a sliding engine component according to the present invention, having electroplated metallic layers on a substrate.

FIG. 1A schematically illustrates a bearing shell 100 (e.g. an exemplary sliding engine component) in the form of a hollow semi-cylindrical bearing lining shell, which is also commonly referred to as a "half bearing". The half bearing 100 has a substrate 102, and a lower electroplated metallic layer (first electroplated metallic layer) and an upper electroplated metallic layer 104Z (second electroplated metallic layer) on the substrate, which provide lower and upper overlay layers, respectively. Further layers (not shown in FIG. 1A) may also be provided between the substrate 102 and the lower electroplated metallic layer 104A (e.g. optional functional layers, e.g. a lining layer and/or a diffusion barrier layer), and/or between the electroplated metallic layers 104A and 104Z (e.g. a further electroplated metallic layer).

The substrate 102 provides strength and resistance to deformation of the half bearing 100, when it is assembled within a main bearing housing or within a connecting rod big end of an engine, for example.

Figure 1B:
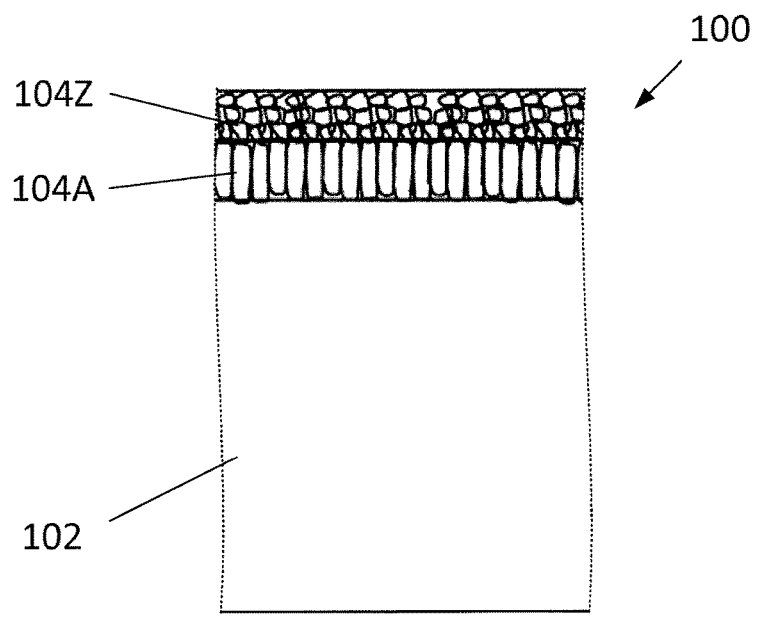
FIG. 1B shows a cross-sectional view through part of the bearing shell of FIG. 1A.
Figures 1C, 1D:
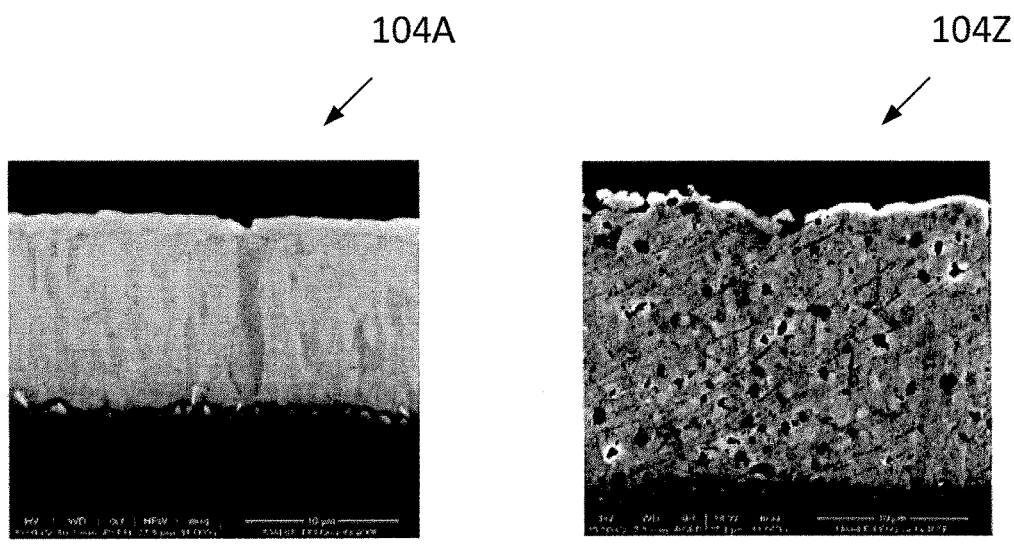
FIGS. 1C and 1D show scanning electron microscope images of parts of the electroplated metallic layers of the bearing shell of FIG. 1A.

FIG. 1B shows a cross-sectional view through part of the half bearing 100 of FIG. 1A, schematically showing the grain structures of the lower electroplated metallic layer 104A and the upper electroplated metallic layer 104Z, which have been exaggerated for the purposes of clarity. FIGS. 1C and 1D respectively show cross-sectional micrographs from a scanning electron microscope of the lower electroplated metallic layer 104A and the upper electroplated metallic layer 104Z of a bearing shell 100 manufactured in accordance with the present invention, which illustrate exemplary grain structures in overlay layers of an exemplary bearing shell.

The upper electroplated metallic layer 104Z faces a cooperating moving part in a bearing assembly, e.g. the bearing shell receives a journaled shaft in an assembled bearing, which mutually cooperate, with an intervening film of lubricating oil. The upper electroplated metallic layer 104Z is configured to provide a running surface (i.e. sliding surface) for the bearing shell 100 over the lifetime of a vehicle containing the bearing shell, and is softer and more ductile than the harder, lower electroplated metallic layer 104A. The upper electroplated metallic layer 104Z is able to accommodate small misalignments between the bearing surface and the cooperating moving part (i.e. has good conformability) and is able to receive and embed dirt particles circulating in the lubricating oil supply, so as to prevent scoring or damage to the journal surface by the debris (i.e. has good dirt embeddability). Further, the grain structure of the upper electroplated metallic layer may preferentially disrupt the propagation of fatigue cracks from the bearing surface, relative to the grain structure of the lower electroplated metallic layer.

The lower electroplated metallic layer 104A provides suitable bearing running properties, if the upper electroplated metallic layer 104Z should become worn through, and provides high wear resistance and load carrying capability. Further, the material of the lower electroplated metallic layer 104A is harder than the material of the upper electroplated metallic layer 104Z. Consequently, the lower electroplated metallic layer 104A better resists being worn through, which could result in damaging contact between the shaft journal and the underlying substrate 102, since the substrate (e.g. a steel backing or any lining layer) has a lower seizure resistance and compatibility than the electroplated metallic layers.

The grains in the lower electroplated metallic layer 104A and the upper electroplated metallic layer 104Z each have an aspect ratio defined by the length of the grains in the direction perpendicular to the surface of the substrate 102 (i.e. in the growth direction during electroplating) relative to the width of the grains in the direction parallel to the surface of the substrate. As shown in FIGS. 1B to 1D, the grains in the lower electroplated metallic layer 104A have a higher aspect ratio than the grains in the upper electroplated metallic layer 104Z. The differing performances of the lower electroplated metallic layer 104A and the upper electroplated metallic layer 104Z are provided by the different grain structures. In particular, the grain structure of the lower electroplated metallic layer 104A is generally columnar (with column-like grains extending away from the substrate 102) and the grains structure in the upper electroplated metallic layer 104Z is generally equiaxed. The grains of the lower electroplated metallic layer 104A have an aspect ratio in the range 2:1 to 30:1, and preferably at least 4:1. In the case that the lower electroplated metallic layer 104A is deposited with a DC cathodic current, it has been found that the grains may have an aspect ratio of approximately 10:1. The grains of the upper electroplated metallic layer 104Z have an aspect ratio of less than 1.5:1, and are preferably approximately equiaxed (i.e. having an aspect ratio of approximately 1:1). Advantageously, grains having lower aspect ratios (e.g. having sides of approximately equal axial length) have more grain boundaries on which to slip than grains having higher aspect ratios, and thus have higher ductility, whilst grains having higher aspect ratios (e.g. columnar grains) have higher strength, less ductility, and higher load carrying capacity.

The electroplated metallic layers 104A and 104Z are deposited onto the substrate 102 by providing the substrate as a cathode in a bath containing an electroplating electrolyte and an anode, and applying a cathodic bias (i.e. a negative bias that is applied to the cathode relative to the anode). The cathodic bias creates a cathodic current (i.e. a negative current, with respect to the anode) that drives the positively charged metallic ions towards the cathode, and deposits the metallic ions onto the cathode surface. The anode is preferably formed of a material corresponding to the metallic layers that are to be deposited. For example, when depositing electroplated metallic layers of pure tin (apart from incidental impurities), as in the illustrated bearing shells 100, it is preferable to use a high purity tin anode.

The electrolyte comprises the ions to be deposited onto the cathode (e.g. tin ions), and may additionally comprise performance enhancing additives, e.g. brightener and anti-foaming agent. The chemical composition and pH of the electrolyte are maintained during deposition by replenishment of the chemicals consumed from the electrolyte. The electrolyte may be maintained at a temperature of 20 to 30° C.

A first exemplary electrolyte is a lead-free, tin methanesulfonic acid (MSA) electrolyte (tin ions in methanesulfonic acid) comprising a solution of:

30 to 60 g/l tin, although concentrations of 15 to 80 g/l may be used;
100 to 200 g/l methanesulfonic acid;
3 to 6 ml/l brightener (35 to 50% wt 2-isopropoxyethanol, and 5 to 10% wt 4-phenylbut-3-en-2-one);
40-80 ml/l starter (20 to 25% wt 2-naptholpolyglycolether, 1 to 2.5% wt 1,2-dihydroxybenzene, and 1 to 2.5% wt methacrylic acid); and
balance to 1l of deionized water.

A second exemplary electrolyte is a lead-free, tin sulfuric acid electrolyte (tin ions in sulphuric acid) comprising a solution of:

10 to 50 g/l tin;
10 to 45 g/l sulphuric acid;
2 to 6 ml/l brightener;
2 to 6 ml/l starter; and
balance to 1l of deionized water.

The lower electroplated metallic layer 104A and the upper electroplated metallic layer 104Z are each deposited by electroplating with a pulsed cathodic bias, with different pulsed cathodic biases being used to electroplate layers with different grain structures, in which the grains have different aspect ratios. The use of a pulsed cathodic bias interrupts the growth of grains, promoting the nucleation of new grains, and enables the boundary region of electrolyte adjacent the deposition surface of the cathodic substrate to replenish with an increased concentration of metallic ions (the boundary region becomes depleted during the cathodic bias). Alternatively, the lower electroplated metallic layer 104A may be deposited by direct current (DC) plating.

During the electroplating pulse cycles, the average cathodic current density is between 1 and 10 A/dm$^2$, the frequency is 0 to 100 Hz, and the duty cycle (i.e. the proportion of each cycle during which the cathodic bias is applied) is from 10 to 100% (i.e. DC electroplating has a frequency of 0 Hz and a duty cycle of 100%). However, the pulse cycle of the upper electroplated metallic layer 104Z has a higher frequency and/or a lower cathodic duty cycle than the pulse cycle (or DC current) of the lower electroplated metallic layer 104A, which produces a lower aspect ratio in the grain structure of the upper electroplated metallic layer than in the grain structure of the lower electroplated metallic layer.

Figure 2A:
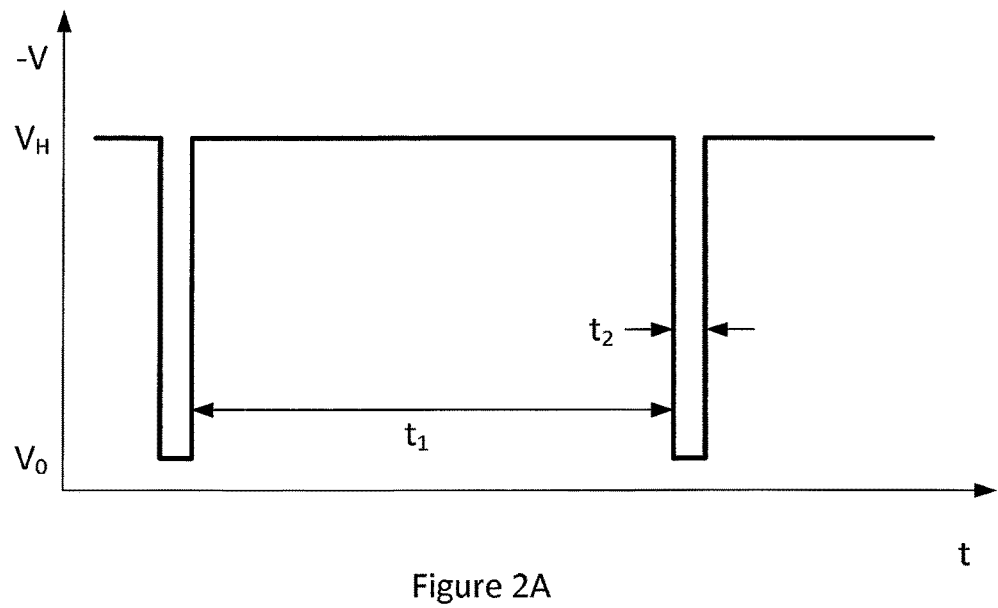
FIGS. 2A and 2B show repeating cycles of bias pulses having respective first and second repetition frequencies and duty cycles.
Figure 2B:
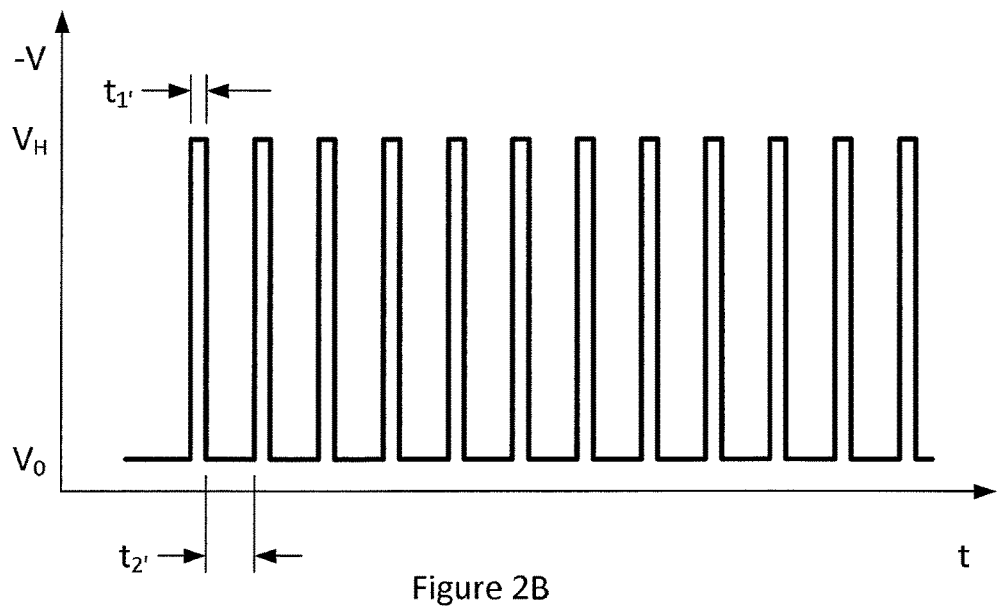

FIGS. 2A and 2B schematically illustrate the cathodic bias pulse cycles applied during the deposition of the lower electroplated metallic layer 104A and the upper electroplated metallic layer 104Z of the bearing shell 100, which have a high cathodic bias $V_H$ pulse portion $t_1$ and $t_{1'}$ and a zero cathodic bias $V_0$ portion $t_2$ and $t_{2'}$. The lower electroplated metallic layer 104A is deposited with a frequency (i.e. $1/\{t_1/\{t_1+t_2\}\}$) of 0 to 10 Hz and a duty cycle (i.e. $t_1/\{t_1+t_2\}$) of 70 to 100%, which produces a columnar grain structure. The upper electroplated metallic layer 104Z is deposited with a frequency (i.e. $1/\{t_{1'}+t_{2'}\}$) of 50 to 500 Hz and a duty cycle (i.e. $t_{1'}/\{t_{1'}+t_{2'}\}$) of 10 to 30%, which produces an approximately equiaxed grain structure.

Figure 3:
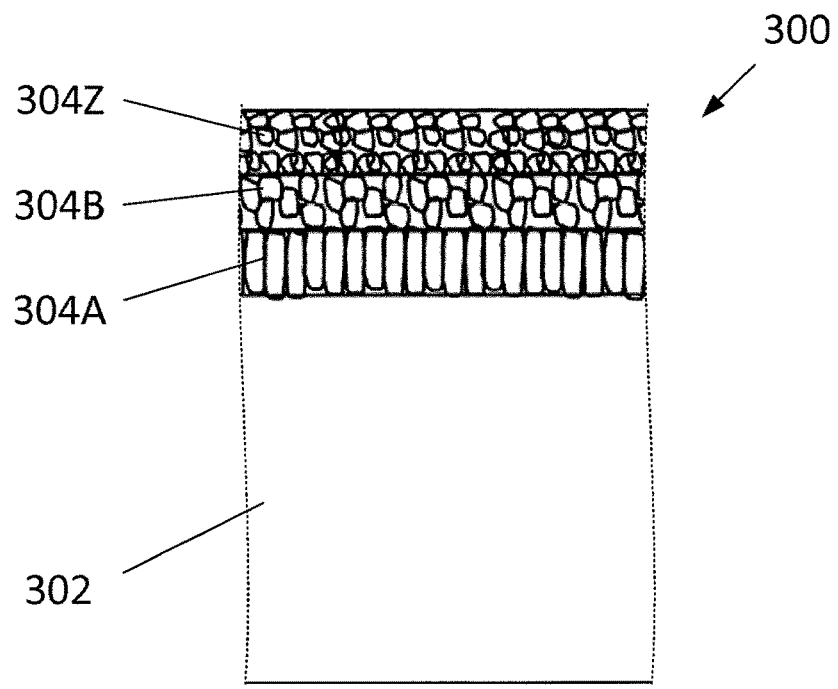
FIGS. 3 and 4 show cross-sectional views through parts of alternative bearing shells according to the present invention.

FIGS. 1A and 1B show a bearing shell having two electroplated metallic layers. However, further, intermediate electroplated metallic layers 304B may additionally be provided between the lower electroplated metallic layer 304A and the upper electroplated metallic layer 304Z, which have a grain size with an aspect ratio that is intermediate the aspect ratios of the lower electroplated metallic layer and the upper electroplated metallic layer, as is shown schematically in FIG. 3. The intermediate layers 304B are deposited with a pulse cycle and/or cathodic duty cycle that are intermediate those of the lower electroplated metallic layer 304A and the upper electroplated metallic layer 304Z. Advantageously, electroplated metallic layers having grain structures with intermediate aspect ratios provide a graduated transition in mechanical performance properties, and may reduce internal stresses arising between successive layers of mismatched grains.

Figure 4:
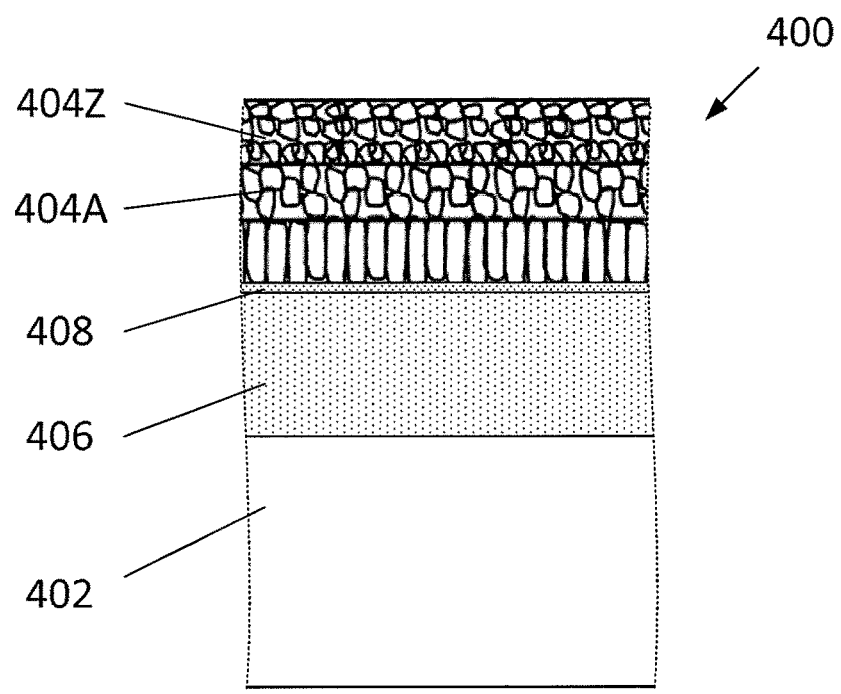

As shown in FIG. 4, the substrate may comprise further layers provided between the electroplated metallic layers 404A, 404B and 404Z and the backing 402, e.g. a main lining layer 406 to provide a further bearing surface if the electroplated metallic layers should become worn through, and a nickel interlayer 408 which provide a diffusion barrier to prevent migration of mobile ions between the main lining layer and the electroplated metallic layers.

The bias pulse cycles shown in FIGS. 2A and 2B have only constant bias cathodic pulses interspersed with unbiased (off) periods. However, alternatively, the cathodic pulses may be ramped up in bias either gradually or in steps. Further, the pulse cycles may comprise a double polarity pulse cycle, in which an anodic bias pulse portion (i.e. a reverse bias, relative to the cathodic bias) may additionally be provided. During the anodic bias pulse portion, some of the cathodically deposited ions are de-plated from the cathode, between the deposition that occurs during successive cathodic pulse portions, further enhancing the interruption in the grain growth, and promoting the nucleation of new grains during subsequent re-growth.

Hard particulate, such as boron carbide, alumina, silicon nitride, boron nitride, silicon carbide, niobium carbide, titanium nitride, or titanium carbon nitride, with a particle size of less than 7 μm, may be co-deposited with the metallic ions, which form a metallic matrix in which the hard particulate is distributed. The hard particulate may be suspended in the electrolyte with a concentration of approximately 20 g/l (operation has been demonstrated with 10 to 200 g/l hard particulate, and preferably 10 to 30 g/l). Ultrasonic and/or mechanical stirring agitation is used to maintain the hard particulate in suspension during deposition.

The rate of metallic matrix deposition under a constant cathodic current is limited by the ionic mobility of the metal ions (e.g. tin ions), due to the presence of a depletion region in the electrolyte, against the cathode surface. Although hard particulate from the suspension adheres onto the surface, slow deposition of the metal ions that occurs under constant cathodic current is inefficient at incorporating the surface particles into the deposited layer, with the particles instead remaining on the surface as the metallic matrix layer grows. In contrast, during the zero cathodic bias portions (and similarly during lower cathodic bias portions or during anodic bias portions), the concentration of metal ions close to the cathode surface is able to increase, leading to a rapid burst of matrix deposition occurring during the high cathodic bias portions, during which there is an enhanced efficiency of incorporation of the hard particulate into the deposited metallic matrix of the layer.

The use of anodic pulse portions may advantageously be used when co-depositing hard particulate. Such anodic bias pulses de-plate metal ions from the deposited layer, providing a high concentration of ions close to the cathode surface, further increasing the subsequent rate of deposition during the high cathodic bias pulse portion, and further enhancing the incorporation of hard particulate into the deposited layer of metallic matrix.

Although illustrated in the figures in relation to a half bearing shell, the present invention equally applies to other sliding engine components, including semi-annular, annular or circular thrust washers, and bushes, and engines comprising such sliding engine components.

Apart from the micrographs in FIGS. 1C and 1D, the figures provided herein are schematic and not to scale.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A sliding engine component, comprising:
   a substrate having a surface coated with a first electroplated metallic layer and a second electroplated metallic layer, the first metallic layer disposed between the substrate and the second metallic layer;
   wherein the first metallic layer and the second metallic layer have a grained structure, and the grained structure of each of the first metallic layer and the second metallic layer having an aspect ratio between a mean grain size perpendicular to the surface of the substrate and a mean grain size parallel to the surface of the substrate; and
   wherein the aspect ratio of the second metallic layer is less than the aspect ratio of the first metallic layer, and wherein the aspect ratio of the second metallic layer is less than 1.5:1.

2. The sliding engine component according to claim 1, wherein the aspect ratio of the first metallic layer is at least 2:1.

3. The sliding engine component according to claim 1, wherein the aspect ratio of the first metallic layer is at least 4:1.

4. The sliding engine component according to claim 1, wherein the aspect ratio of the first metallic layer is up to 30:1.

5. The sliding engine component according to claim 1, wherein the first metallic layer has a substantially columnar grain structure.

6. The sliding engine component according to claim 1, further comprising at least one of a lining layer and a nickel interlayer disposed between the first metallic layer and the substrate.

7. The sliding engine component according to claim 1, wherein the second metallic layer has a substantially equiaxed grain structure.

8. The sliding engine component according to claim 1, further comprising a third electroplated metallic layer provided between the first metallic layer and the second metallic layer,
   wherein third metallic layer has a grained structure having an aspect ratio between the mean grain size perpendicular to the surface of the substrate and the mean grain size parallel to the surface of the substrate, and
   wherein the aspect ratio of the third metallic layer is less than the aspect ratio of the first metallic layer and greater than the aspect ratio of the second metallic layer.

9. The sliding engine component according to claim 1, wherein at least one of the first metallic layer and the second metallic layer includes tin.

10. The sliding engine component according to claim 1, wherein at least one of the first metallic layer and the second metallic layer is composed of pure tin, apart from incidental impurities.

11. The sliding engine component according to claim 1, wherein at least one of the first metallic layer and the second metallic layer is a composite layer including a hard particulate distributed in a metallic matrix.

12. The sliding engine component according to claim 1, wherein the first metallic layer is composed of tin to provide tin grains defining the grained structure.

13. An engine, comprising: a sliding engine component, the sliding engine component including:

a substrate having a surface including a multi-layer coating, the multi-layer coating including a first electroplated metallic layer and a second electroplated metallic layer, the first metallic layer disposed between the substrate and the second metallic layer;

wherein the first metallic layer and the second metallic layer have a grained structure, and the grained structure of each of the first metallic layer and the second metallic layer having an aspect ratio between a mean grain size perpendicular to the surface of the substrate and a mean grain size parallel to the surface of the substrate, and wherein the aspect ratio of the second metallic layer is less than the aspect ratio of the first metallic layer;

wherein the first metallic layer and the second metallic layer are each composed of tin to provide tin grains defining the grained structure; and wherein the aspect ratio of the second metallic layer is less than 1.5:1.

14. The engine according to claim 13, wherein at least one of the first metallic layer and the second metallic layer is composed of pure tin, apart from incidental impurities.

15. The engine according to claim 13, wherein at least one of the first metallic layer and the second metallic layer is a composite layer including a tin matrix and hard particulates distributed in the tin matrix, and wherein the hard particulates include at least one of boron carbide, alumina, silicon nitride, boron nitride, silicon carbide, niobium carbide, titanium nitride, and titanium carbon nitride.

16. The engine according to claim 13, wherein at least one of the grained structure of the first metallic layer is a substantially columnar grain structure and the grained structure of the second metallic layer is a substantially equiaxed grain structure.

17. The engine according to claim 13, wherein the aspect ratio of the second metallic layer is approximately 1:1 to provide a substantially equiaxed grain structure.

18. A sliding engine component, comprising:

a substrate having a surface including a multi-layer coating;

the multi-layer coating including a first electroplated metallic layer, a second electroplated metallic layer, and a third electroplated metallic layer, the first metallic layer disposed between the substrate and the second metallic layer, and the third metallic layer disposed between the first metallic layer and the second metallic layer;

wherein the first metallic layer, the second metallic layer, and the third metallic layer have a grained structure, the grained structure of each of the first metallic layer, the second metallic layer, and the third metallic layer having an aspect ratio between a mean grain size perpendicular to the surface of the substrate and a mean grain size parallel to the surface of the substrate; and wherein the aspect ratio of the second metallic layer is less than the aspect ratio of the first metallic layer, and wherein the aspect ratio of the third metallic layer is less than the aspect ratio of the first metallic layer and greater than the aspect ratio of the second metallic layer.

19. The sliding engine component according to claim 18, wherein the aspect ratio of the first metallic layer is at least 4:1 and the aspect ratio of the second metallic layer is less than 1.5:1.

* * * * *